(12) United States Patent
Pau et al.

(10) Patent No.: US 6,891,891 B2
(45) Date of Patent: May 10, 2005

(54) MOTION ESTIMATION PROCESS AND SYSTEM

(75) Inventors: Danilo Pau, Sesto San Giovanni (IT); Emiliano Piccinelli, Monza (IT); Fabrizio Rovati, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 704 days.

(21) Appl. No.: 09/849,503

(22) Filed: May 4, 2001

(65) Prior Publication Data

US 2002/0012396 A1 Jan. 31, 2002

(30) Foreign Application Priority Data

May 5, 2000 (EP) .............................................. 00830332

(51) Int. Cl.⁷ ................................................. H04N 7/12
(52) U.S. Cl. ................... 375/240.16; 382/236; 348/700
(58) Field of Search ....................... 375/240.16, 240.15, 375/240.03, 240.24, 240.27; 348/699, 416.1, 452, 700; 382/236

(56) References Cited

U.S. PATENT DOCUMENTS

| | | | | |
|---|---|---|---|---|
| 5,581,308 A | * | 12/1996 | Lee | 348/699 |
| 5,668,608 A | * | 9/1997 | Lee | 348/699 |
| 5,745,183 A | * | 4/1998 | Lam | 375/240.15 |
| 5,786,860 A | | 7/1998 | Kim et al. | 348/416 |
| 6,014,181 A | | 1/2000 | Sun | 348/699 |
| 6,512,550 B1 | * | 1/2003 | de Garrido et al. | 348/452 |
| 6,563,872 B2 | * | 5/2003 | Suzuki | 375/240.03 |

OTHER PUBLICATIONS

Accame, "An Integrated Approach to Block Based Motion Estimation for Video Coding", *IEEE Transactions on Consumer Electronics* 44(1):52–61, 1998.

Kim, "Block Motion Estimation Based on Spatio–Temporal Correlation", *IEEE Tencon—Digital Signal Processing Applications*, , pp. 955–960, Nov. 1996.

Wiegand, "Block–Based Hybrid Video Coding Using Motion–Compensated Long–Term Memory Prediction", Telecommunications Institute, University of Erlangen–Nuremberg, pp. 153–158, 1997.

* cited by examiner

*Primary Examiner*—Gims Philippe
(74) *Attorney, Agent, or Firm*—Lisa K. Jorgenson; E. Russell Tarleton; Seed IP Law Group PLLC

(57) ABSTRACT

A motion estimation process in video signals organized in successive frames divided into macroblocks that is carried out by the identification of motion vectors. In a first identification phase, starting from a current motion vector, a best motion vector predictor is identified, chosen from a set of candidates. The best predictor thus identified is then subjected to a second refining phase. The aforesaid set of candidates is identified by selecting vectors belonging to macroblocks close to the current vector within the current frame and the preceding frame. Preferably, the refining phase comprises the definition of a grid of n points centered on the central position to which the best motion vector points and the distance of the points of the grid from the center is defined as a function of the matching error typically consisting of an SAD function, defined in the first identification phase. Application to the IPB and APM operating modes of the H.263+ video standard is envisaged.

36 Claims, 3 Drawing Sheets

| M | I | N |
|---|---|---|
| H | G | J |
| L | K | O |

Frame t-1

| C | B | D |
|---|---|---|
| A |   |   |

Frame t

MOTION ESTIMATION PROCESS AND SYSTEM

TECHNICAL FIELD

The present invention relates to motion estimation techniques which can be used, for example, in systems for processing and transmitting video signals.

DESCRIPTION OF THE KNOWN ART

Most of the motion estimation techniques developed in recent years can be essentially divided into certain basic categories, namely:

i) fast search techniques, which attempt to mitigate complexity by reducing the number of candidate motion vectors that are tested in the search area. The choice of the vectors is driven in a heuristic way with the aim of locating the absolute minimum of the cost function. Examples of this category are the solutions known as Three Step Search, Fast Search, New Three Step Search and Four Step Search, documented, for example, in the papers by B. Furth, J. Greenberg and R. Westwater, "Motion Estimations Algorithms for Video Compression," Kluwer Academic Publishers, 1997; R. Li, B. Zeng and M. L. Liou, "A new Three-Step Search Algorithm for Block Motion Estimation," *IEEE Transactions on Circuits and Systems for Video Technology*, Vol. 4, No. 4, August 1994, pp. 438–441; L.-M. Po and W.-C. Ma, "A novel Four-Step Search Algorithm for Fast Block Motion Estimation," *IEEE Transactions on Circuits and Systems for Video Technology*, Vol. 6, No. 3, June 1996, pp. 313–317;

ii) fast matching techniques, in which the complexity is reduced by decreasing the number of points on which the cost function is calculated. Examples of this category are the techniques of quincunx sub-sampling and one-bit transform techniques described in the papers by K. Lengwehasatit and A. Ortega, "A Novel Computationally Scalable Algorithm for Motion Estimation," VCIP '98, January 1998; B. Natarajan, V. Bhaskaran and K. Konstantinides, "Low-Complexity Block-Based Motion Estimation via One-Bit Transforms," IEEE Transactions on Circuits and Systems for Video Technology, Vol. 7, August 1997, pp. 702–706;

iii) techniques using a spatio-temporal correlation. In these, the motion vector is selected from those which have already been calculated in the current end for the preceding frames. This vector is frequently the starting point of a refining process, as documented in the paper by J. Chalidabhongse and C.-C. Kuo, "Fast Motion Vector Estimation Using Multiresolution-Spatio-Temporal Correlations," *IEEE Transactions on Circuits and Systems Technology*, Vol. 7, No. 3, June 1997, pp. 477–488, and in the paper by K. Lengwehasatit and A. Ortega cited previously;

iv) hierarchical or multiresolution techniques, in which the motion vectors are first searched for in a low-resolution image and then refined in the normal-resolution image, as documented in the paper by J. Chalidabhongse and C.-C. Kuo cited previously; and v) rate-distortion optimized techniques, which are not really low-complexity algorithms, since the cost function is somewhat more complicated, taking into account not only the energy of the motion-compensated differential signal but also that derived from the choice of the motion vector (the number of bits required for coding it, the coding modes, etc.), as documented in the paper by F. Kossentini, Y.-W. Lee, Mark J. T. Smith and R. K. Ward, "Predictive RD Optimized Motion Estimation for Very Low Bit-Rate Video Coding," *IEEE Journal on Selected Areas in Communications*, Vol. 15, No. 9, December 1997, pp. 1752–1763.

SUMMARY OF THE INVENTION

The embodiment of the present invention disclosed herein provides a solution that, while retaining characteristics of low complexity, makes it possible to obtain results essentially comparable with the results obtainable with techniques based on an exhaustive search.

According to the embodiments of the present invention, a process is disclosed having the characteristics that are radically different from the fast search techniques mentioned previously, in which the computational complexity is contained by correspondingly limiting the search area to a restricted number of points.

The disclosed embodiment of the invention also differs from the solutions called Rate-Distortion Optimized to which reference was made previously, in which a Lagrangian function which combines the residual energy with the number of bits consumed is used to evaluate the motion vectors. A motion vector is estimated from a diamond-shaped search area divided into levels on the basis of the existing correlation between adjacent macroblocks.

The motion vectors from all macroblocks on the same level are considered and then combined suitably with a prediction function (mean, median, weighted mean, and statistical mean) to generate a new motion vector on which the Lagrangian function can be evaluated and the decision made as to whether other levels must be tested.

When compared with the solutions described in the previously cited papers by Chalidabhongse and Kuo and by Lengwehasatit and Ortega, the solution according to the invention is essentially different during the refining phase, since the choice of the best candidate, on the basis of the spatio-temporal correlation between the vectors with respect to the adjacent macroblocks, is the same for all the algorithms. However, in these algorithms the refining phase is a recursive process, since the refining grid is moved until no reduction of the cost function is obtained.

On the other hand, in the solution disclosed, the refining phase is conducted on a grid with a fixed number of points. The grid can be amplified to permit recovery of the estimation errors, but the number of points of the grid is always the same.

The embodiment of the invention includes three fundamental advantages over the known solutions:

the disclosed embodiment has constant complexity, since the number of operations is the same for all the macroblocks, the motion vector range is independent of any search window, and the embodiment has low complexity, since the number of operations required is negligible by comparison with other algorithms.

BRIEF DESCRIPTION OF THE DRAWINGS

The disclosed embodiment will now be described, purely by way of example and without restrictive intent, with reference to the attached drawings, in which.

DETAILED DESCRIPTION OF THE INVENTION

Figure 1:
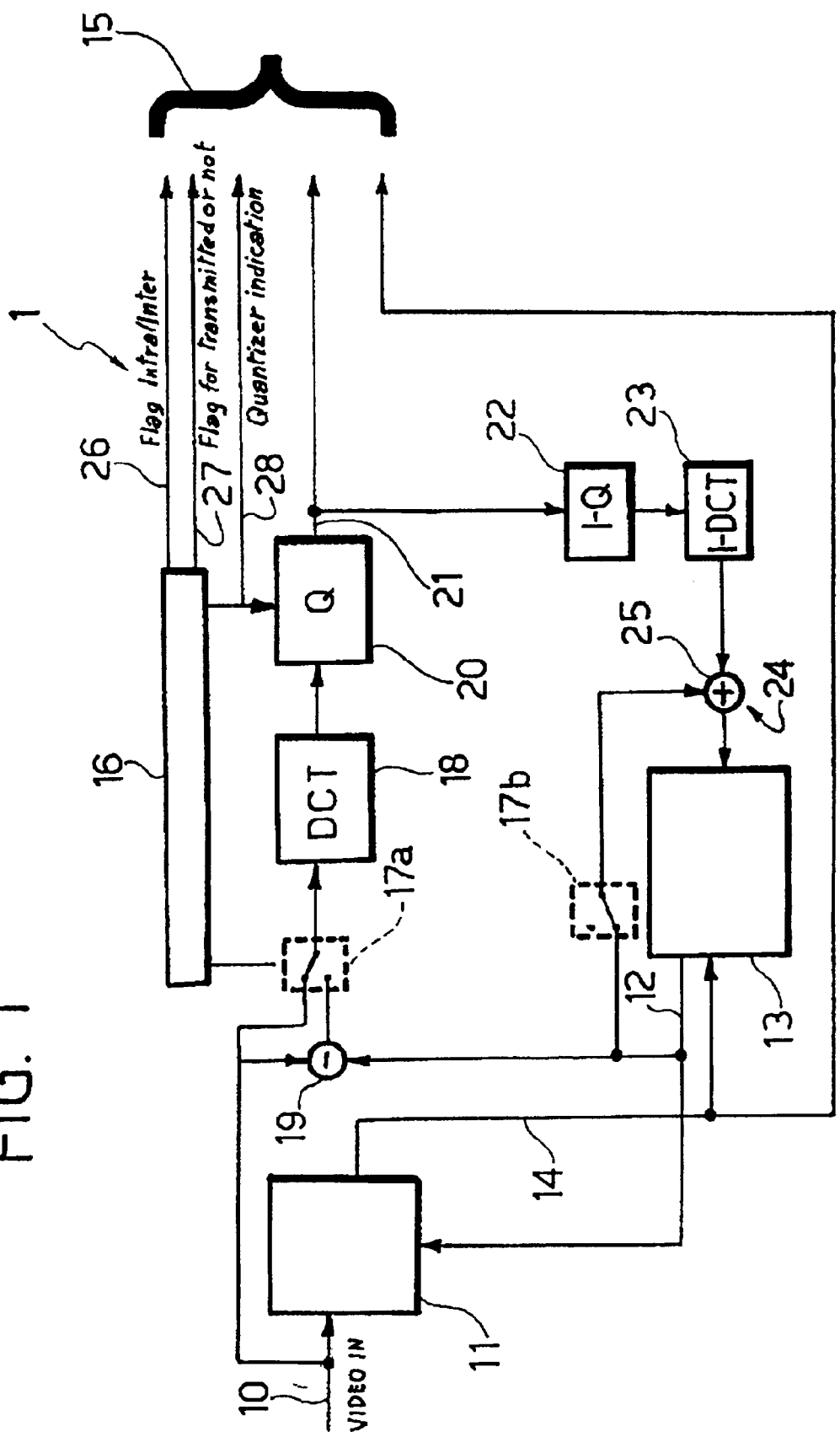
FIG. 1 shows, in the form of a block diagram, the structure of one stage of a video signal processing system in which the solution according to the invention can be applied.

In the diagram in FIG. 1, the numeric reference 1 indicates as a whole a digital video signal processing stage designed to be associated, for example, with a video signal coder.

In the diagram in FIG. 1 (to be considered as entirely known) the reference 10 indicates the input line on which the video signal is supplied in digital form. The reference 11 indicates a motion estimation block designed to operate on the signal arriving on line 10 in accordance with the prediction data obtained via a line 12 from a memory 13 in which the prediction frames are stored. The output line of the block 11, indicated by 14, is that on which the motion estimation vectors are present.

The line 14 leads both to the memory 13 and to the set of output lines of the device 1, indicated as a whole by 15.

The reference 16 indicates the coding control block designed to act on two switching blocks 17a, 17b and also for other purposes.

The switching block 17a is designed to transfer to the block 18, which implements what is commonly called the DCT (acronym for Discrete Cosine Transform) function, either of the following alternatives:

the signal present on the input line 10, the signal obtained in a difference block 19 as the difference between the signal present on the input line 10 and the signal taken from the output line 12 of the memory 13.

The output of the block 18 is sent to a quantization block 20 which acts under the control of the coding control block 16.

The output of the block 20, indicated by 21, forms another of the outputs 15 of the device 1. The signal present on the line 21 is also sent to two blocks 22, 23 which carry out, in cascade, functions which are the inverse of the functions carried out by the blocks 20 and 18, in such a way as to reconstitute samples which can be transmitted to the memory 13 via a further line 24. An adding node 25, to which the output line of the switch 17b leads, is inserted in the line 24. The operation of this node is coordinated with the operation of the switch 17a in such a way that, when the block 17a transfers the signal present on the input line 10 to the block 18, the signal present on the line 12 is added in the block 25 to the output signal of the block 23.

In addition to the lines 14 and 21 described above, the set of output lines 15 of the device 1 comprises further lines 26, 27 and 28, all leading from the coding control block 16 and designed to carry the intra/inter flag, transmitted or not-transmitted flag, and quantizer indication signals respectively. It will be appreciated that the line 28 effectively coincides with the line via which the block 20 is driven by the block 16.

The whole of the above descriptions relates to criteria that are known and are mainly recapitulated here in order to provide an illustration of a possible field of application of the invention.

In general, any motion estimation process (such as that implemented, for example, by the block 11 of FIG. 1) must associate, with each macroblock into which a frame of a sequence of video images has been divided, a motion vector which points to the macroblock of a preceding frame of reference that is as similar as possible to the current macroblock. For this purpose, the current block must be compared with some or all of the macroblocks of the frame of reference within a search area appropriately bounded by means of a suitable cost function which measures the difference between the two macroblocks.

There are various functions that can estimate the matching and/or the residual error. They are generally functions of the pointwise difference between the two macroblocks.

In a preferred embodiment of the invention, the function called SAD (acronym for Sum of Absolute Differences) is used. This is a function capable of providing a good trade-off between precision and calculation complexity. As a possible alternative, use could be made, for example, of the SSD (acronym of Sum of Squared Differences) function. This alternative solution has some advantages in terms of reliability, since it calculates the real energy associated with the difference. However, it has a drawback in that it requires a multiplication.

The SAD function is defined as follows:

$$SAD(m,n)=\Sigma|B(i,j)-B'(i+m,j+n)| \qquad (I)$$

where the summation extends to all the values i,j belonging to the macroblock and $B(i,j)$ is the pixel intensity in the position i,j of the current frame and $B'(i+m,j+n)$ is the corresponding pixel intensity in the preceding frame, shifted by a vector with components x,y equal to m and n respectively.

The SAD function is a measure of the motion vector quality, since a correct motion vector produces a low SAD, while an incorrect motion vector produces a high SAD.

The calculation of the SAD is therefore executed for all candidates which can possibly be selected as motion vectors for a given macroblock. The motion vector producing the lowest SAD is selected as the motion vector for the macroblock in question, and is used for the corresponding prediction function.

The motion estimation process according to the disclosed embodiment of the invention belongs to the category of processes based on the evaluation of the spatio-temporal correlation existing among motion vectors belonging to adjacent blocks.

If the motion field varies slowly both locally and from frame to frame is true, then it may be possible to check only a few sets of candidate motion vectors. The candidate motion vector that produces the minimum SAD is selected as the predictor motion vector which, after a refining phase, yields the final motion vector.

Since it provides for the use of a motion vector acting as a predictor, this solution is classed as a prediction process.

Like all processes of this type, it is essentially based on two phases, namely:

the identification of the candidate predictors, and the refining of the best predictor.

At the end of the whole process, the motion vector that produces the lowest SAD is associated with each macroblock.

The first phase mentioned above therefore consists in identifying, from a set of candidates, the predictor motion vector identified as the best and therefore as that to which the subsequent refining phase is to be applied.

With the objective of achieving a low-complexity solution, the embodiment of the invention is intended to reduce the number of candidates as far as possible and, in the same way, to select "good" candidates, presumably those close to the correct vector.

The criterion for constituting the set of candidates is that of selecting the vectors of the relative macroblock position, in the current frame and in the preceding frame, which is close to the current vector. Naturally, there is a constraint due to the fact that a predictor vector must be calculated in advance. Since the macroblocks are normally subjected to scanning in lexicographical order, only the vectors belonging to macroblocks located above and to the left of the current one are available as vectors usable as predictors.

Figures 2, 5:
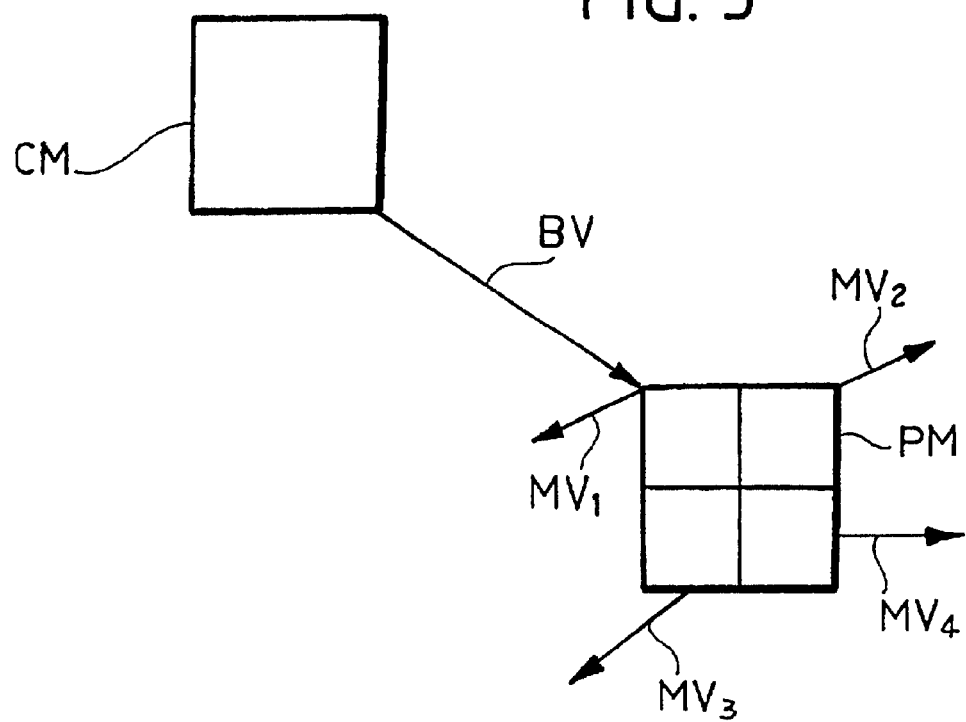
FIG. 2 shows the criteria for the execution of the spatial and temporal correlation function on macroblocks according to the invention.
FIGS. 4 and 5 show schematically the application of the invention to the H.263+ video standard.

FIG. 2 shows a solution to reduce the number of candidates while keeping the computation cost low. In a preferred embodiment, the solution according to the invention uses—for a macroblock—four candidate predictors; more precisely, these are two spatial predictors (one to the left and one above the current macroblock) taken from the same frame, and two temporal predictors (one homologous with and one to the left of the current macroblock) in the preceding frame.

This solution is shown schematically in FIG. 2, where the preceding frame (frame t-1) is shown on the left and the current frame (frame t) is shown on the right.

The current macroblock is the one left blank in the right-hand part of FIG. 2 and the macroblock G in the left-hand part of FIG. 2 represents the homologous macroblock of the preceding frame.

For clarity, the two spatial predictors taken from the frame t are those indicated by the letters A and B. The two temporal predictors are those indicated by the letters G and H in the frame t-1.

The motion vector, of the set thus defined, which produces the lowest residual error (for example, the lowest SAD function) is used as the starting point for the subsequent refining phase and is indicated below as the "best motion vector predictor."

When the predictor in question has been determined, the process continues with a refining phase implemented by means of a grid of n points that is applied to it.

Figure 3:
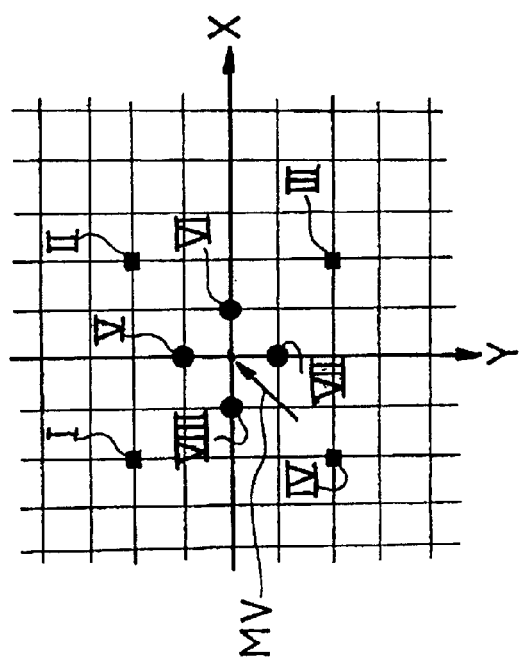
FIG. 3 shows the execution of the refining function as part of the solution according to the invention.

An example of such a grid is shown in FIG. 3. The grid in question is formed by four points I to IV at the vertices of a square and four further points V to VIII located at the vertices of a square of smaller size with its sides inclined at 45° to the sides of the square at whose vertices the points I to IV are located.

The background grid shown in FIG. 3 is a half pixel grid and it is assumed that points I to VIII are positioned at points of intersection of the lines of this grid.

The aforesaid grid is considered to be centered on the position to which the best motion vector MV points.

The distance of points I to VIII from the center is defined by a linear function which depends on the matching error found during the preceding step (for example, a distance defined as the product of corresponding coefficients and the corresponding SADs). Additionally, since the process operates with motion vectors with a precision of half a pixel, in a preferred embodiment, the points are at a distance of half a pixel from the center.

After all the points on the grid have been considered, the vector with the lowest SAD is selected as the motion vector for the current macroblock and is used for its motion compensation.

In those cases in which the best predictor may be incorrect, for example in the presence of a change of scene in the environment of a rapidly changing motion, the grid correction can be amplified. The grid is amplified only when the best predictor has a high SAD, which means that it is probably not a good predictor.

Starting from the analysis of the SAD distributions found for some sample sequences, it is possible to determine a linear function of the SAD (for example, the same coefficient×SAD function mentioned above), which can be used to calculate the magnitude of the amplification function and the number of points, while also discriminating the conditions in which amplification is necessary from those in which this step is not necessary.

A measure of the complexity of the solution according to the invention (particularly in respect of the comparison with other known solutions, such as those based on a full search algorithm) is provided by the number of times that the cost function is calculated. In the case in question, the measure can be found in the number of operations of calculating the SAD function per macroblock.

It should be noted that this measure of complexity is completely independent of the format and frame frequency of the sequence on which the coding process is carried out, and is therefore valid for all the coding algorithms.

For a full search algorithm, the number of calculations of the SAD depends on the dimensions of the search area. For example, in the default prediction operating mode of the H.263+ video standard (see the document Image Processing Lab, University of British Columbia, "TMN (H.263+) encoder/decoder, version 3.0," TMN (H.263+) codec, September 1997) the search area has a size of 32×32 pixels. Additionally, the best motion vector that is found is refined with a precision of half a pixel, by the application of a grid on n points. Therefore, the computational complexity of the full search algorithm is $$OP_{MB}=Num.SAD_{integer-pixel}+Num.SAD_{half-pixel}=32\times32+8=1032 \quad \text{(II)}$$

However, the embodiment of the invention requires, in the example of embodiment illustrated here, four calculations of SAD for the selection of the best predictor (see FIG. 2) and eight calculations for the refining grid (see FIG. 3). The calculation of the SAD function for the null vector must be added to these calculations. In conclusion, the total number of calculations of the SAD function is given, in the solution according to the invention, by:

$$OP_{MB}=Num.SAD_{half-pixel}+Num.SAD_{Null-Vector}=12+1=13 \quad \text{(III)}$$

The embodiment of the invention can therefore be used to reduce the computational cost by approximately 90% with respect to the full search algorithm. Moreover, the cost is stable because the total number of calculations of the SAD function is the same for each macroblock. This gives rise to a considerable advantage of the solution according to the invention over other motion estimation algorithms with variable complexity deriving from their interactive form.

The embodiment of the invention lends itself to particularly advantageous developments with reference to the H.263+ video standard mentioned above.

This standard provides some optional modes which can be used to improve the subjective quality of the reconstructed sequences. In general, however, the use of these modes produces a more or less significant increase in the computational cost.

In the context of the illustration of the present invention it is advantageous to consider, among these options included in the standard, some options which are closer to the problem of motion estimation, in other words the improved PB-frames mode, abbreviated to "IPB mode," and the advanced prediction mode (commonly abbreviated to "APM"). The integration of these options into a predictive algorithm makes them more uniform with the standard.

For a description of the IPB mode, reference may usefully be made to the documents ITU Telecom Standardization Sector of ITU, "Video Coding for Low Bitrate Communication," Draft 21 ITU-T, Recommendation H.263+ Version 2, January 1998 and ITU Telecom Standardization Sector of ITU, "Video Codec Test Model, Near Term, Version 10," TMN10 ITU-T, April 1998, as well as to the general document on the H.263+ standard cited previously, which are incorporated herein by reference in their entirety.

As a variation from the standard, it is possible to introduce one change only in order to permit its integration in a functional way into the algorithm. This change relates to the order in which the motion estimation is carried out. The standard applies the motion estimation on the P frame of the PB pair first and then on the B frame of the pair (even if the temporal order is exactly the reverse).

However, this solution has the drawback that the temporal predictors of the B frame of the PB pair would be chosen from the reference motion field relating to the successive frame in temporal terms.

Figure 4:
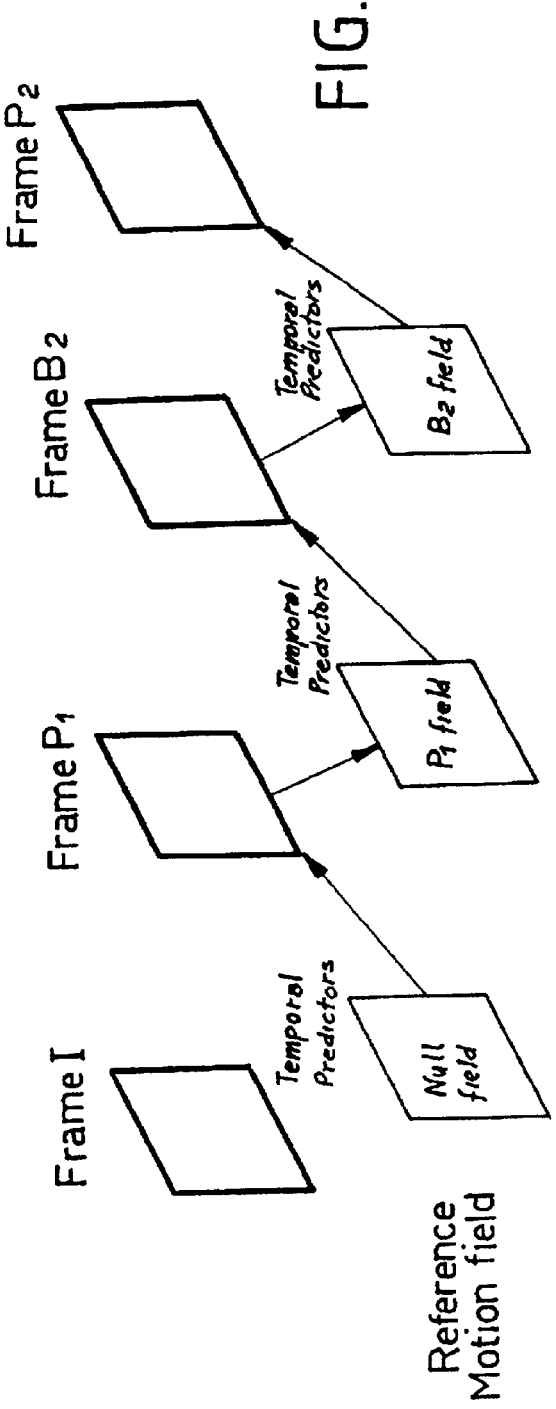

In the solution shown in FIG. 4, however, it can be seen that, in a possible application of the embodiment of the invention, the estimation order is inverted to maintain the temporal continuity of the frames. In particular, FIG. 4 shows, in the context of the frame sequence in the IPB mode, the management of the first PB pair (in other words, the frames $P_2B_2$).

The ITU documents cited previously provide a detailed description of the APM mode.

In this field of application, the disclosed embodiment of the invention makes it possible, for example, to associate the frame of a macroblock with four vectors instead of only one. All this is done in order to provide a more accurate estimate.

As indicated in the standard, the use of the APM consists in an application of the motion estimation algorithm to the current macroblock (to obtain an associated motion vector as in the base mode) and a successive application of the same algorithm for each 8×8 block forming the 16×16 macroblock to which the previously found vector points (so that four associated vectors are obtained for the current macroblock). By means of special preference rules, the coder chooses the optimal mode for preparing the current macroblock.

In the embodiment shown schematically in FIG. 5, based on the application of the solution according to the invention, the predictive process is applied in its full version only to the search vector associated with the 16×16 macroblock. On the other hand, only the refining phase of the algorithm is applied to the search for the four vectors for the 8×8 blocks.

This scheme is shown in FIG. 5, where CM indicates the current macroblock and PM indicates the macroblock found by prediction.

The arrow BV indicates the obtaining of the best motion vector for the current 16×16 macroblock, implemented by means of the predictive process, while the arrows $MV_1$, $MV_2$, $MV_3$ and $MV_4$ illustrate the obtaining of four corresponding best vectors obtained by the refining phase for the corresponding four 8×8 blocks of the PM macroblock obtained by prediction.

In the case of the APM mode, the complexity of the process according to the invention is greater as compared with the base version, owing to the fact that the number of predictor candidates is higher. For example, if the algorithm uses the equivalent of twenty-one predictors for a total of twenty-one SAD calculation operations per macroblock (it is emphasized that this is the maximum number of operations), the gain in terms of complexity is 1.62 times with respect to that of the base version.

Clearly, provided that the principle of the invention is retained, the details of implementation and the forms of embodiment can be widely varied from what has been described and illustrated, without thereby departing from the scope of the present invention as defined by the attached claims.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A process for motion estimation in video signals organized in successive frames divided into macroblocks, the process comprising: a first identification phase in which, starting from a current motion vector, a best motion vector predictor is identified within a set of candidates, and a second phase of refining the best motion vector predictor thus identified; the set of candidates formed from vectors belonging to macroblocks association with the current vector within the current frame and the preceding frame, the refining phase comprising the operation of forming a grid of n points centered on the central position to which a best mode vector points, the distance of the points of the grid from the center being defined as a linear function of a matching error defined in the first identification phase.

2. The process of claim 1, wherein the set includes, in the preceding frame, the vector homologous to the said current motion vector.

3. The process of claim 1, compromising the operation of scanning the macroblocks in lexicographic order within each frame, as a result of which the set includes, within the current frame, vectors belonging to macroblocks located above and to the left of the current macroblock.

4. The process of claim 1, wherein the set includes vectors belonging to at least one of the macroblocks chosen from the group consisting of:
   in the current frame, macroblocks located to the left of and above the current macroblock, and
   in the preceding frame, the homologous macroblock and the macroblocks located to the left of the current macroblock.

5. The process of claim 1, wherein the best predictor is identified, within the set, as the predictor that minimizes a residual error measurement function.

6. The process of claim 5, wherein the function is the SAD function.

7. The process of claim 5, wherein the function is the SSD function.

8. The process of claim 1, wherein the distance is defined as the product of a coefficient and the error function.

9. The process of claim 1, wherein the error function is the SAD function.

10. The process of claim 1, comprising the operation of selecting as the motion vector for the current macroblock, within the said grid, the motion vector that minimizes a further residual error function.

11. The process of claim 10, wherein the further residual error function is the SAD function.

12. The process of claim 1, comprising the operation of selectively amplifying the grid by a given amplification factor.

13. The process of claim 12, comprising the operation of monitoring the quality of the predictor as a function of a given error function, and wherein the grid is amplified when the predictor has an error function greater than the given value.

14. The process of claim 13, wherein the grid amplification factor is calculated as a function of the analysis of the distribution of the error function for some sample sequences.

15. The process of claim 1, applied to the IPB operating mode of the H.263+ video standard for the processing of pairs of PB frames, comprising the operation of selecting the temporal predictors of the B frame of a BP pair before the temporal predictors of the P frame of the BP pair.

16. The process of claim 1, applied to the APM operating mode of the H.263+ video standard, in which the frame of a macroblock is associated with a plurality of vectors, preferably four in number, associated with a corresponding plurality of further blocks constituting the macroblock to which the previously found motion vector points, in which the first identification phase is applied to the macroblock, while the second phase is applied to the blocks of the plurality to identify the plurality of vectors.

17. A system for motion estimation in video signals organized in successive frames divided into macroblocks by means of the identification of motion vectors, the system comprising: a motion estimation block configured to implement a first identification phase in which, starting from a current motion vector, a best motion vector predictor is identified within a set of candidates, and a second phase of refining the best predictor thus identified; the said set of candidates being formed from vectors belonging to macroblocks close to the current vector within the current frame and the preceding frame, the estimation block configured to implement the refining phase by forming a grid of n points centered on the central position to which the best mode vector points, the distance of the points of the grid from the center defined as the function, preferably linear, of the matching error defined in the first identification phase.

18. The system of claim 17, wherein the estimation block is configured to include in the set in the preceding frame the vector homologous to the current motion vector.

19. The system of claim 17, wherein the motion estimation block is configured to scan the macroblocks in lexicographic order within each frame, as a result of which the set includes, within the current frame, vectors belonging to macroblocks located above and to the left of the current macroblock.

20. The system of claim 17, wherein the estimation block includes in the set vectors belonging to at least one of the macroblocks chosen from the group comprising:
   in the current frame, macroblocks located to the left of and above the current macroblock, and
   in the preceding frame, the homologous macroblock and the macroblocks located to the left of the current macroblock.

21. The system of claim 17, wherein the estimation block selects the best predictor, within the set, as the predictor that minimizes a residual error measurement function.

22. The system of claim 21, wherein the function is the SAD function.

23. The system of claim 21, wherein the function is the SSD function.

24. The system of claim 17, wherein the distance is defined as the product of a coefficient and the error function.

25. The system of claim 17, wherein the error function is the SAD function.

26. The system of claim 17, wherein the estimation block selects, as the motion vector for the current macroblock, within the grid, the vector that minimizes a further residual error function.

27. The system of claim 10, wherein the further residual error function is the SAD function.

28. The system of claim 17, wherein the estimation block is capable of selectively amplifying the grid by a given amplification factor.

29. The system according to claim 28, wherein the estimation block monitors the quality of the predictor as a function of a given error function, and amplifies the grid when the predictor has an error function greater than the given value.

30. The system of claim 28, wherein the estimation block calculates the grid amplification factor as a function of the analysis of the distribution of the error function for some sample sequences.

31. The system of claim 17, configured to operate according to the IPB operating mode of the H.263+ video standard for the processing of pairs of PB frames, in which the estimation block selects the temporal predictors of the B frame of a BP pair before the temporal predictors of the P frame of the BP pair.

32. The system of claim 17, configured to operate according to the APM operating mode of the H.263+ video standard, in which the estimation block associates the frame of a macroblock with a plurality of vectors, preferably four in number, associated with a corresponding plurality of further blocks constituting the macroblock to which the previously found motion vector points, in which the estimation block applies, respectively,
   the first identification phase to the macroblock, and
   the second phase to the blocks of the plurality to identify the plurality of vectors.

33. A motion estimation process, comprising:
   identifying a best motion vector predictor as the predictor that minimizes a residual error measurement function within a set of candidates formed from vectors belonging to at least one macroblock chosen from a group of macroblocks in the current frame of macroblocks located to the left of and above the current macroblock, and in the preceding frame the homologous macroblock and the macroblocks located to the left of the current macroblock; and
   refining the best motion vector predictor so identified, comprising the operation of forming a grid of n points centered on a central position to which a best mode vector points, including defining the distance of the best mode vector pointing to the center as a linear function of a matching error previously defined in identifying the best motion vector predictor.

34. The process of claim 33, wherein the residual error measurement function comprises a SAD (sum of absolute differences) function.

35. The process of claim 33, wherein the residual error measurement function comprises a SSD (sum of squared differences) function.

36. The process of claim 33, wherein the distance is defined as a product of a coefficient of the residual error measurement function.

* * * * *